United States Patent [19]

Watanabe et al.

[11] Patent Number: 5,179,574
[45] Date of Patent: Jan. 12, 1993

[54] SPREAD PN CODE SIGNAL RECEIVER

[75] Inventors: Shintaro Watanabe; Yasushi Yamaguchi; Shigeyuki Nakayama; Hirotaka Namioka; Hisashi Terada, all of Tokyo, Japan

[73] Assignee: Kabushiki Kaisha Kenwood, Tokyo, Japan

[21] Appl. No.: 787,642

[22] Filed: Nov. 4, 1991

Related U.S. Application Data

[60] Division of Ser. No. 428,005, Oct. 27, 1989, Pat. No. 5,090,023, which is a continuation of Ser. No. 920,606, Oct. 20, 1986, abandoned.

[30] Foreign Application Priority Data

| Sep. 29, 1986 [JP] | Japan | 61-228291 |
| Sep. 29, 1986 [JP] | Japan | 61-228292 |
| Sep. 29, 1986 [JP] | Japan | 61-228293 |

[51] Int. Cl.⁵ .......................................... H04L 27/30
[52] U.S. Cl. .............................. 375/1; 380/34; 375/120
[58] Field of Search ............ 307/262, 511; 328/55, 328/133, 155; 375/120, 1; 455/260; 340/825.31, 825.34; 380/34; 318/600

[56] References Cited

U.S. PATENT DOCUMENTS

| 3,745,248 | 7/1973 | Gibson | 328/155 X |
| 3,956,710 | 5/1976 | Seitz et al. | 307/511 X |
| 4,564,794 | 1/1986 | Kilen et al. | 318/600 X |
| 4,691,201 | 9/1987 | Kokubu | 340/825.31 |

FOREIGN PATENT DOCUMENTS

58-131840  8/1983  Japan.

*Primary Examiner*—Bernarr E. Gregroy
*Attorney, Agent, or Firm*—Sixbey, Friedman, Leedom & Ferguson

[57] ABSTRACT

A spread PN code signal receiver having a delay locked loop (DLL) circuit in an IF or RF stage characterized in that correlation outputs to be used for the DLL circuit control are (1) a correlation output between (a) a PN code advanced in phase with respect to the received signal and (b) the received signal and (2) a correlation output between (a) a PN code delayed in phase with respect to the received signal and (b) the received signal. The correlation outputs are used to detect the lock-/unlock signal in the DLL circuit. In particular, AND logic for these two correlation outputs is employed to generate the lock/unlock signal only when the DLL circuit is perfectly synchronized in phase with the received signal. With this feature, a lock state can not de detected unitl a stable lock state is obtained.

2 Claims, 4 Drawing Sheets

SPREAD PN CODE SIGNAL RECEIVER

This is a divisional application of Ser. No. 07/428,005, filed Oct. 27, 1989, now U.S. Pat. No. 5,090,023, which was a continuation of Ser. No. 06/920,606 filed Oct. 20, 1986, now abandoned.

BACKGROUND OF THE INVENTION

1. Field of the Invention

The present invention relates to a spread spectrum communication system and, more particularly, to a receiver.

2. Related Background Art

Different from the narrow band communication which is conventionally widely used, the spread spectrum communication is the system for spreading the energy of information signals to a very wide frequency band. Therefore, this communication has various advantageous features which cannot be obtained in the conventional communication and can be applied to various wide fields such as space communication, ground communication (in particular, mobile transceiver), distance measurement, instrumentation, and the like.

The spread spectrum system includes the following systems.

(1) DS (Direct Sequence) system
(2) FH (Frequency Hopping) system
(3) TH (Time Hopping) system
(4) Pulse coding FM system
(5) Hybrid system In general, at present, the DS and FH systems are used, the TH system and pulse coding FM system are applied to the limited fields, and the hybrid system is being theoretically studied. The principle of the DS system will now be described. On the transmission side, the information signal is subjected to an ordinary modulation (primary modulation). The primary-modulated signal is then modulated by the spread pseudo noise code (spread PN code) of a wide band and transmitted as a wide band signal having a very small power density. This operation is called a spread modulation. On the reception side, the correlation with the received or incoming signal is derived by use of the same demodulating PN code as that on the transmission side. After the correlation was obtained, only the signal to be received is converted into the original primary-modulated signal of the narrow band. The other signals and interference signal become the wide band noises having a small power density. Only a desired signal is extracted by a filter. The primary modulation can use the analog system such as FM and the digital system such as PSK. In general, the PSK system by the pseudo noise (PN) code is used as the spread modulation. The ratio of the band width between the primary-modulated signal and the signal after it was spread is called a process gain. As the process gain is large, the advantages of the spread spectrum system are obtained. In general, the process gain is set to 1000 to 10000.

It is required that the demodulating PN code which is generated on the reception side has the same bit constitution and the same phase as those of the PN code in the incoming or received spread spectrum signal. Therefore, the initial synchronization (synchronization trapping) is performed to make the phase of the PN code on the reception side coincide with the phase of the PN code in the incoming signal. Next, in order to keep the phase-coincident PN code on the reception side, the synchronization holding process is performed by a delay-locked loop circuit (DLL). One frame or one burst of the spread spectrum signal consists of preamble data (consisting of, e.g., 256 bits) which is used for the initial synchronization and message data subsequent thereto.

The conventional PN code synchronization system uses the sliding correlation system in which, for example, the correlation with the reference PN code which was generated at a bit clock rate different from that of the incoming PN code is detected and the spread PN code generator is synchronized. According to the conventional sliding correlation system, the time until the synchronization is detected is so long to be, e.g., 1 to 20 seconds. This time is too long for the burst communication of tens of milliseconds which will be further developed in the future, so that such a sliding correlation system has the problems such that it is unfitted to and cannot be used for the burst communication. It is also possible to consider the constitution using an elastic surface wave convolver device (hereinafter, referred to as an SAW convolver in this specification) having the same processing time as the length of preamble data in order to reduce the synchronization detection time. However, there is the problem such that if the processing time in the SAW convolver exceeds a predetermined value, the SAW convolver enlarges in size and the mass production is difficult and the SAW convolved becomes expensive. On the contrary, a method whereby the length of preamble data is made coincident with the processing time of the SAW convolver can be also considered. However, in such a case, there is also the problem such that one period of the PN code is reduced, resulting in lack of secrecy of communication.

To control the synchronization of the PN code generator of the DLL and the like, it is important to detect the lock and unlock of the DLL unit which keeps the synchronization of the spread spectrum communication system. In the conventional techniques, in the case of detecting the lock and unlock of the DLL by the detection output after the reversal spreading, a dedicated band pass filter (BPF) of a narrow band and an envelope detector are provided and a lock/unlock signal is derived from the output of the envelope detector, or the lock and unlock are detected from the output of the envelope detector constituting the DLL.

According to the former conventional technique, there is the problem such that in addition to the band pass filter constituting the DLL and the envelope detector, it is necessary to additionally provide a band pass filter of a narrow band and an envelope detector to detect the lock and unlock.

According to the latter conventional technique, since only the output of one envelope detector, namely, only one correlation detection output is taken out, there is the problem such that the lock and unlock are detected irrespective of the output of the other envelope detector, namely, the other correlation detection output, and the lock state is detected before the stable lock state is obtained, so that the detection is uncertain.

In the receiver of the spread spectrum system, hitherto, the correlation between the output of the PN code generator for the initial synchronization (hereinafter, referred to as the reference PN code generator) and the preamble data in the incoming spread spectrum signal is detected by using two different nth-order PN code generators for the initial synchronization and for the spread spectrum demodulation, the initial synchronization is performed, and the PN code which was phase synchronized with the incoming spread spectrum signal is output from demodulation PN code generator (hereinafter, referred to as the demodulation PN code generator) for the data demodulation after the initial synchronization, thereby keeping the synchronization and demodulating the data.

According to the conventional technique mentioned above, the reference PN code generator and demodulation PN code generator are respectively independently constituted.

Therefore, there is the problem such that the shift register constituting a part of the reference PN code generator and the shift register constituting a part of the demodulation PN code generator are independent.

OBJECT AND SUMMARY OF THE INVENTION

It is, therefore, an object of the present invention to provide a PN code synchronization system which makes it possible to accurately initially synchronize with the PN code at a high speed by use of an SAW convolver of a short processing time.

Another object of the invention is to provide a lock detecting circuit of a delay locked loop which can certainly detect the lock and unlock states with a simple constitution.

Still another object of the invention is to provide a PN code generator which commonly uses a shift register.

In a PN code synchronization system of a spread spectrum signal having preamble data according to the present invention, the true correlation output is detected from the AND of the correlation output which is generated from an SAW convolver having a processing time shorter than the preamble data interval and the validation pulse of a time width relating to the processing time, the first interval after a shift pulse was supplied to a reference PN code generator until the true correlation output is generated is measured; the substantial processing time of the SAW convolver is subtracted from the first interval to determine the initial synchronization time point; and a spread spectrum demodulation PN code generator is synchronized from the initial synchronization time point determined.

In this constitution, the correlation between the preamble data and the PN code which is generated from the reference PN code generator is detected by the SAW convolver. The AND logic is taken in the correlation output and the validation pulse having a pulse width relating to the preamble data interval. The false correlation output is substantially extinguished in the SAW convolver having a processing time shorter than the preamble data interval, so that the true correlation output is detected.

On the other hand, although the reference PN code is output after the shift pulse was supplied to the reference PN code generator, the first interval from this time point until the true correlation output is generated is measured.

The first interval is concerned with the substantial processing time of the SAW convolver, the preamble data interval, and the delay time from the supply of the shift pulse until the preamble data is transmitted to the SAW convolver from the "0"th bit. The subtraction value which is obtained by subtracting the substantial processing time of the SAW convolver form the first interval corresponds to the interval from the generation of the true correlation output until the time point of the initial synchronization, namely, until the position of the PN epoch as the boundary between the preamble data of the spread spectrum signal and the information code.

Therefore, the time point of the initial synchronization, namely, the position of the PN epoch is determined from the time point of generation of the true correlation output and the subtraction value. The diffusion demodulation PN code generator is synchronized from the time point of the initial synchronization and the demodulation can be performed.

In a PN code synchronization system of a spread spectrum signal having a preamble data according to another aspect of the invention, the true correlation output is detected from the AND of the correlation output which is generated form the SAW convolver having a processing time shorter than the preamble data interval and the validation pulse having a pulse width relating to the preamble data interval; the initial value corresponding to the processing time is set into a counter to count the second clock pulse having the period of $\frac{1}{2}$ of the period of the first clock pulse to be supplied to the reference PN code generator; the second clock pulse is counted up by the counter for the time interval from the start of detection of the correlation between the preamble data and the output of the reference PN code generator until the true correlation output is generated; the second clock pulse is counted down by the counter from the time point of generation of the true correlation output; when the count value of the counter due to the down-counting operation becomes a predetermined value, an output pulse is generated from the counter; and the diffusion demodulation PN code generator is synchronized in association with the output pulse.

In this constitution, the correlation between the preamble data and the PN code which is output from the reference PN code generator is detected by the SAW convolver. The AND logic is taken in the correlation output and the validation pulse having a pulse width relating to the preamble data interval. The false correlation output to be detected is substantially extinguished in the SAW convolver having a processing time shorter than the preamble data interval, so that the true correlation output is detected. This point is the same as the first invention.

On the other hand, since the correlation output of the SAW convolver is obtained at every period of $\frac{1}{2}$ of the generation period of the PN code, a counter to count the second clock pulse of the period of $\frac{1}{2}$ of the period of the first clock to be supplied to the reference PN code generator is provided, and the second clock pulse is counted by this counter. In this case, the initial value is set so as to correspond to the timing of the PN epoch when the count value of the counter becomes a predetermined value while the second clock pulse is being counted down. This initial value corresponds to the processing time of the SAW convolver. The counter into which the initial value was set counts up the second clock pulse for the time interval from the start of detection of the correlation between the preamble data and the output of the reference PN code generator until the generation of the true correlation output. The counter starts counting down from the generation of the true correlation output. During this down-counting operation, when the count value of the counter becomes the foregoing predetermined value, an output pulse is generated from the counter. The time point of generation of the output pulse corresponds to the position of the PN epoch as mentioned above. The spread spectrum demodulation PN code generator is synchronized by the output pulse which is generated from the counter.

The initial synchronization of the preamble data is accomplished by the foregoing operations. Subsequently, the synchronization is held by, e.g., the delay locked loop unit and the demodulation in the spectrum reversal spreading and the demodulation for information can be performed.

A lock/unlock detecting circuit according to another aspect of the invention comprises: a first comparator which receives the first correlation detection output in the DLL unit; a second comparator which receives the second correlation detection output in the DLL unit; and an AND gate which receives the outputs of the first and second comparators, wherein a lock/unlock signal is obtained in response to the output of the AND gate.

In the foregoing constitution, the AND gate outputs the lock signal when the first correlation detection output exceeds the threshold level of the first comparator and the second correlation detection output exceeds the threshold level of the second comparator.

Therefore, the lock signal is not obtained when either one of the first and second correlation detection outputs is at a low level and the first or second comparator doesn't generate an output. Thus, it is prevented that the lock signal is output before the stable lock state is obtained.

Further, since the first and second correlation detection outputs in the DLL unit are supplied to the first and second comparators, there is no need to use a band pass filter and an envelope detector other than the band pass filter and envelope detector of the DLL in order to detect the lock and unlock states.

A PN code generator according to still another aspect of the invention comprises: one n-stage shift register; an initial value set circuit to set the initial value into the n-stage shift register; a first adder to add the outputs from the first desired stages of the n-stage shift register on the basis of modulo "2"; and a second adder to add the outputs from the second desired stages of the n-stage shift register on the basis of modulo "2", wherein the initial value to be set by the initial value set circuit is changed over and the outputs of the first and second adders are switched, thereby allowing the PN code for correlation detection by an SAW convolver and the PN code for data demodulation to be output.

In the foregoing constitution, when the correlation is detected by the SAW convolver, the initial value is set into the n-stage shift register and the output of the first adder which is derived by adding the outputs from the first desired stages on the basis of modulo "2" is selected. The PN code for the generator polynominal of the preamble data is output. The PN code is supplied to the SAW convolver and the correlation with the preamble data is detected.

Further, upon data demodulation, the initial value different from that upon correlation detection is set into the n-stage shift register and the output of the second adder which is obtained by adding the outputs from the second desired stages on the basis of modulo "2" is selected and the PN code necessary for the data demodulation is output. The PN code is supplied to the delay locked loop unit which is cooperatively constituted and the synchronization is kept. The code series is derived by delaying the PN code series or by other method. The code series is multiplied with the incoming spread spectrum signal and the reversal spreading is performed and the demodulation is performed.

Therefore, the shift register to generate the PN code for the correlation detection and the shift register to generate the PN code for the data demodulation are commonly used. This is because no problem will be caused even if the shift registers are commonly used since there is the time delay between the correlation detection and the data demodulation.

DETAILED DESCRIPTION OF THE PREFERRED EMBODIMENTS

Figure 1:
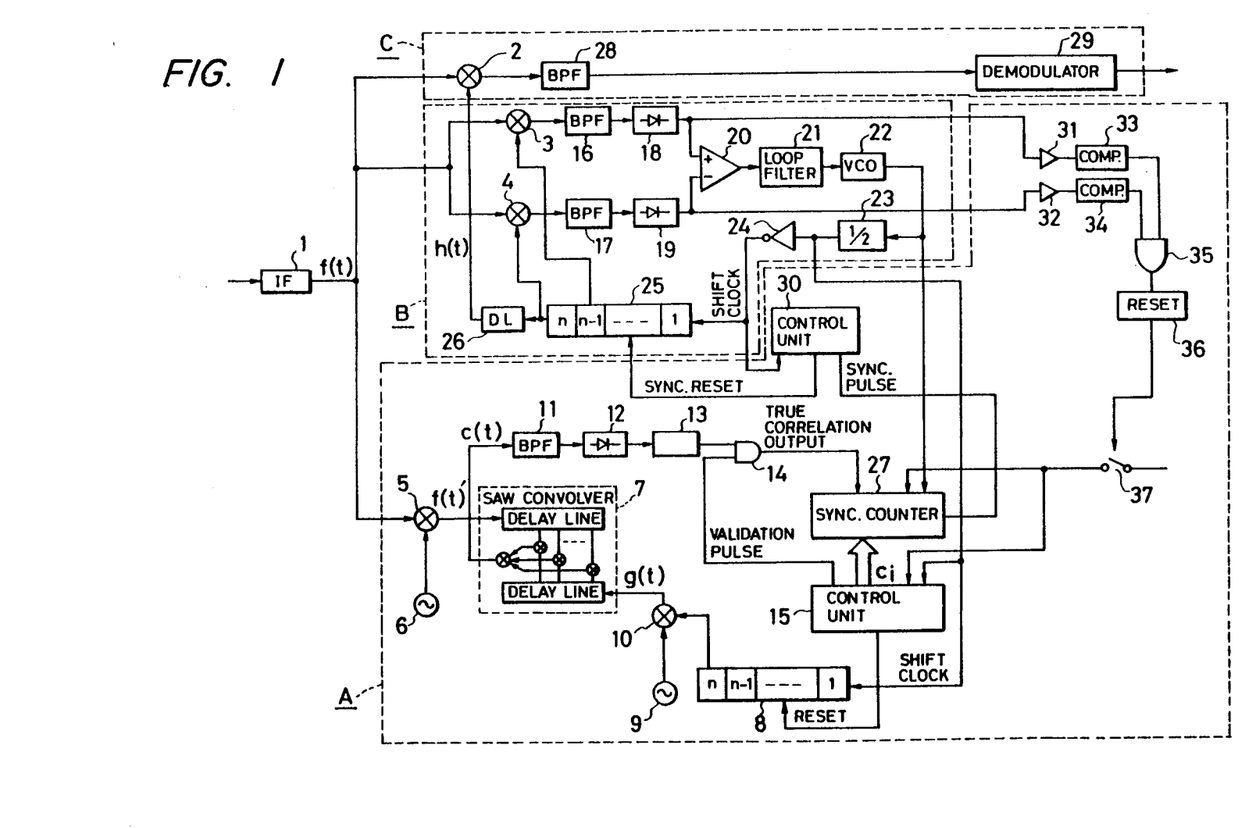
FIG. 1 is a diagram showing a circuit arrangement in an embodiment of a demodulating section in a spread PN code signal receiver according to the invention.

In FIG. 1, the received or incoming spread spectrum signal is RF amplified and frequency converted and becomes the intermediate frequency (IF) signal. The IF signal is amplified by an intermedaite frequency (IF) amplifier 1.

This embodiment is constituted by an initial synchronization unit A which is synchronized with the preamble data of the incoming spread spectrum signal, a delay locked loop unit (hereinafter, abbreviated to a DLL) B, and a de-spread unit C.

The IF signal is supplied to a multiplier 2 for de-spread demodulation provided in the de-spread unit C, to multipliers 3 and 4 constituting a correlation device provided in the DLL B, and further to a frequency mixer 5 for frequency mixing the oscillation output of an oscillator 6.

The intermediate frequency signal f(t) which was frequency converted by the frequency mixer 5 is supplied to one output terminal of an SAW convolver 7 for correlation detection. On the other hand, the PN code pattern which is the same as the PN pattern of the incoming preamble data in the range of the gate length of the SAW convolver 7 and whose time base was inverted is generated from the reference PN code generator 8. The reference PN code and the output from an oscillator 9 are supplied to a BPSK (Binary Phase Shift Keying) 10 and modulated. The BPSK output g(t) from the BPSK 10 is supplied to the other input terminal of the SAW convolver 7 to detect the correlation with the output from the frequency mixer 5. The SAW convolver 7 convolution integrates the signal to be supplied to one input terminal thereof and the signal to be supplied to the other input terminal. These input signals are advanced in the opposite directions and the relative speeds of the signals which pass through SAW convolver 7 are increased, thereby reducing the correlation detection interval. The SAW convolver 7 includes two delay lines and the delay line length corresponds to the gate length, i.e., the processing time. The correlation between the signals f(t) and g(t) in this gate length is examined and the correlation output c(t) is output.

The correlation detection output detected by the SAW convolver 7 is supplied to a band pass filter (BPF) 11. The unnecessary signals out of the band width of the band pass filter 11 are removed. The output of the BPF 11 is detected by an envelope detector 12 and waveform shaped by a waveform shaper 13 and supplied to an AND gate 14. A validation pulse (namely, a pulse to determine a validation range) from a reference PN code generator control unit 15, which will be explained hereinlater, is further supplied to the AND gate 14. Only the correlation output in the validation pulse interval is set to the true correlation output, so that the true correlation signal is obtained from the AND gate 14.

On the other hand, in the DLL unit B, the outputs of the multipliers 3 and 4 are respectively individually supplied to envelope detectors 18 and 19 through band pass filters (BPF) 16 and 17 and detected by the envelope detectors 18 and 19. The detection outputs are supplied to a subtracting amplifier 20 and the output of the envelope detector 19 is subtracted from the output of the envelope detector 18 and the resultant output signal is amplified. The amplified output of the subtracting amplifier 20 is supplied as a control signal to a voltage controlled X'tal oscillator (VCXO) 22 through a loop filter 21. The output oscillating frequency of the VCXO 22 is changed in correspondence to the output of the subtracting amplifier 20. The output of the VCXO 22 is frequency divided by a frequency divider 23 of a dividing ratio of 2. The frequency divided output is supplied as a shift pulse to a demodulation PN code generator 25 through an inverter 24.

The most significant bit (the nth bit) of the PN code generator 25 is supplied to one input terminal of the multiplier 4. The next most significant bit [the (n−1)th bit] of the PN code generator 25 is supplied to one input terminal of the multiplier 3. The bit rates of the PN code generators 8 and 25 are 8 Mb/sec. The free-running frequency of the VCXO 22 is set to 16 MHz, which is twice as large as the bit rates of the PN code generators 8 and 25. This is because the relative speeds of both input signals of the SAW convolver 7 are twice as high as the ordinary signal transmission speed and the correlation output is obtained from the SAW convolver 7 at every half-bit clock. The output of the VCXO 22 is supplied as a clock pulse to a sync counter 27 to count the true correlation output, which counter will be explained hereinafter. The reason why the inverter 24 is provided is because the output of the frequency divider 23 is shifted by the inverter 24 by half period, thereby enabling the synchronization to be easily held by the DLL unit B.

The most significant bit of the PN code generator 25 is supplied as a demodulation PN code to the multiplier 2 in the demodulator unit C through a delay circuit 26 to delay the bit rate by only ½ period. The most significant bit is multiplied with the output of the IF amplifier 1 by the multiplier 2 and de-spreaded. The output of the multiplier 2 is supplied to a demodulator 29 through a band pass filter (BPF) 28. The information output is obtained from the demodulator 29. The phase of the DLL unit B is locked at the intermediate point of one bit clock. Namely, since the PN code to be generated from the initial synchronization point is used in the DLL unit B, it needs to be advanced by half bit clock. In order to use the PN code for the de-spreading, the PN code is delayed by the delay circuit 26 by half period and synchronized with the input signal.

The output of the frequency divider 23 is supplied as a shift clock to the reference PN code generator 8 and is also supplied as a sync pulse to the reference PN code generator control unit 15. The control unit 15 outputs a reference PN code generation control signal for allowing the reference PN code to be repetitively generated from the reference PN code generator 8 for the preamble data interval. The control unit 15 supplies the validation pulse to the AND gate 14 from the time point of generation of the reference PN code and also outputs a sync counter control signal to preset the initial set value into the sync counter 27 to count the true correlation output which is input through the AND gate 14. The sync counter 27 counts up the output pulse from the VCXO 22 from the reference time point of the start of detection of the correlation between the preamble data and the output of the reference PN code generator 8 until the true correlation output is supplied. The sync counter 27 changes the counting mode and counts down the output pulse from the VCXO 22 from the time point of supply of the true correlation output. A borrow output from the sync counter 27 is supplied as a sync pulse to a PN code generator control unit 30. The output from the inverter 24 is supplied as a clock pulse to the control unit 30. The control unit 30 resets the PN code generator 25 until the control unit 30 receives the sync pulse from the sync counter 27. When the control unit 30 receives the sync pulse from the sync counter 27, the control unit 30 substantially makes the PN code generator 25 operative, thereby allowing the demodulation PN code to be output from the PN code generator 25.

Figure 3:
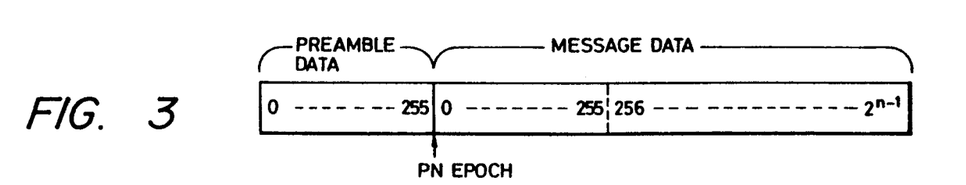
FIG. 3 shows a data signal form in a spread spectrum communication system.

As mentioned above, in the constitution of one embodiment of the invention, the incoming spread spectrum signal is RF amplified and frequency converted and amplified by the intermediate frequency amplifier 1. Thereafter, this signal is frequency converted into the frequency corresponding to the input signal frequency of the SAW convolver 7 by the frequency mixer 5 and oscillator 6 and supplied to the SAW convolver 7. It is now assumed that the spread spectrum signal to be output from the IF amplifier 1 is the burst signal in which the code length is tens of milliseconds and the length of preamble data including the bits for the initial synchronization is 32 μsec (0 to 255 chips) as shown in, e.g., FIG. 3, and that the SAW convolver 7 whose rated processing time is 9 μsec, which is shorter than 32 μ sec, is used.

To make it possible to obtain the initial synchronization of the spread spectrum signal, the correlation between the PN pattern of the preamble data in the incoming spread spectrum signal and the PN pattern of the reference PN code generator 8 needs to be detected and thereby performing the initial synchronization (hereinafter, also referred to as the sync capture) and allowing the PN code to be generated from the demodulation PN code generator 25 from the PN epoch point as the data start point in the incoming spread spectrum signal. Due to this, the correlation with the spread spectrum signal is obtained and the phase of each PN code falls within a range of ½ chip and the synchronization holding (hereinafter, also referred to as the sync trace) can be attained in the DLL unit B. The information output can be demodulated from the incoming spread spectrum signal.

First, as the state before the initial synchronization is obtained, the reference PN code from the reference PN code generator 8 is sequentially shifted by the output from the frequency divider 23 to frequency divide the output of the VCXO 22 which is free-running at 16 MHz into ½, namely, by the clock signal of 8 MHz. The shifted reference PN code is mixed to the oscillation output of the oscillator 9 by the BPSK 10 and modulated into the frequency corresponding to the input signal frequency of the SAW convolver 7. The modulated signal is then supplied to the SAW convolver 7. In this state, the reference PN code from the reference PN code generator 8 has a pattern which is opposite to the PN pattern of the preamble data of the modulation PN code with respect to the time. The correlation between the reference PN code and the preamble data in the incoming spread spectrum signal is detected by the SAW convolver 7.

Figure 2A:
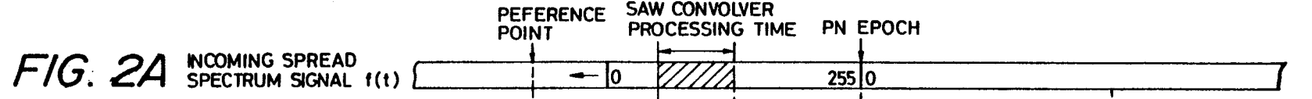
FIGS. 2A to 2G are timing charts for signals in the circuit arrangement in FIG. 1.
Figure 2B:
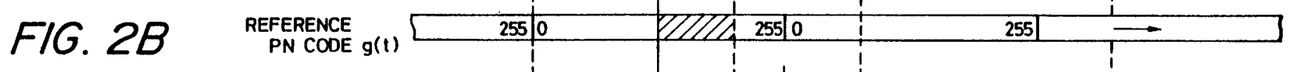

In this case, in response to the reference PN code generation control signal which is output from the reference PN code generator control unit 15, the generator 8 generates the reference PN code g(t) in which the preamble pattern is repeated as shown in FIG. 2B and waits for the supply of the incoming spread spectrum signal f(t) as shown in FIG. 2A.

When both input signals are input to the SAW convolver 7 and the correlation between them is detected, the correlation output is generated from the SAW convolver 7. The unnecessary components in the correlation output are removed by the band pass filter 11 and the correlation output is detected by the envelope detector 12. The detection output is waveform shaped by the waveform shaper 13 and supplied to the AND gate 14.

Figure 4:
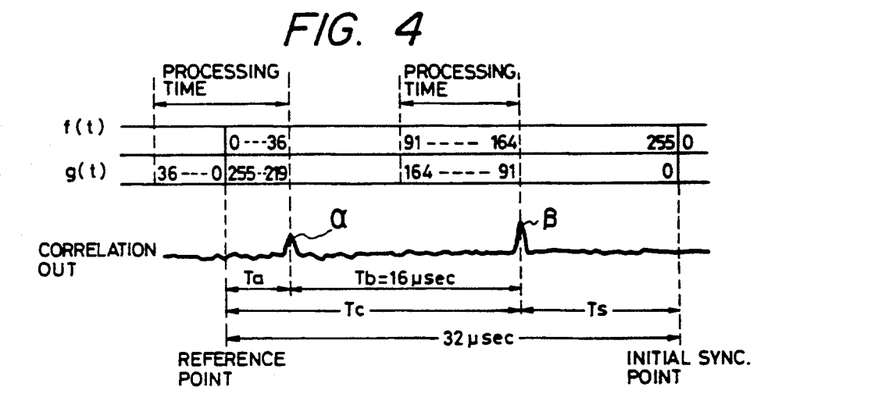
FIGS. 4 to 6 are diagrams for explaining how to determine the initial value of a sync counter in the circuit arrangement in FIG. 1.

As diagrammatically shown in FIG. 4, since the processing time of 9 μsec of the SAW convolver 7 is shorter than the preamble data interval (32 μ sec), the false correlation and true correlation are caused for the interval until the initial sync point. In FIG. 4, the input signal from the mixer 5 is shown by f(t) and the input signal from the BPSK 10 is shown by g(t). FIG. 4 shows the case where the false correlation o is detected by "0" to "36" bits and the correlation 8 is detected by "91" to "164" bits. To prevent the false correlation from being used, the validation pulse is output from the control unit 15 to the AND gate 14, thereby allowing the AND gate 14 to be held open for the generation interval of the validation pulse.

Figure 2C:
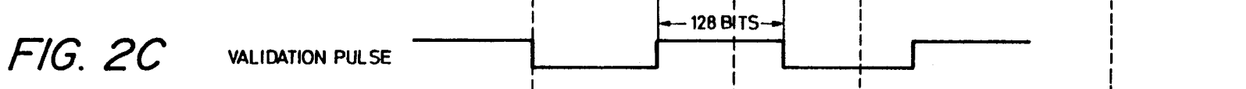
Figure 2D:
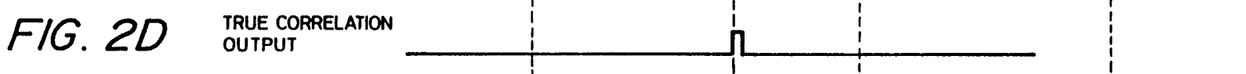
Figure 2E:
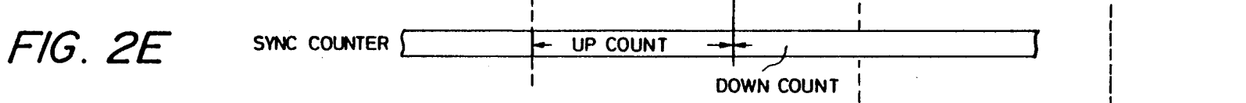

In the embodiment, as shown in FIG. 2C, the width of validation pulse is set to the pulse width (=128 chips) of ½ of the number of chips (=256) of the preamble data and the validation pulse is generated at the timing of the elapse of time corresponding to "128" chips of the PN code after the reference PN code became "0". By varying the time shift or lag between the input signal to 74 bit convolver and the reference signal over 0 to 255 bits, it was examined where the true correlation output is generated. As a result, it was found that the true correlation output was generated during the later half of the preamble. Therefore, the correlation signal due to the false correlation shown in FIG. 4 is blocked by the AND gate 14 and only the true correlation output as shown in FIG. 2D is obtained. In addition, even if the true correlation was early generated subsequent to the reference point, the processing time of the SAW convolver 7 is short and a plurality of processing times exist in the preamble data interval and the opportunity such that the true correlation is again generated in the latter half of the generation interval of the PN code from the reference PN code generator 8 exists. Since the width of validation pulse and the position thereof are set as mentioned above, the true correlation output which was regenerated is output through the AND gate 14.

Figure 2F:
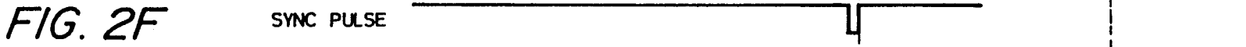

Further, the initial value is set into the sync counter 27 from the control unit 15 synchronously with the reset of the reference PN code generator 8. This initial value is set such that the borrow output from the sync counter 27, namely, the sync pulse shown in FIG. 2F is output at the position which is one bit preceding to the PN epoch when the output of the VCXO 22 is counted down after the generation of the correlation output (FIG. 2D). This initial value also corresponds to the processing time of the SAW convolver 7. As in the embodiment, assuming that the processing time of the SAW convolver 7 is 9 μ sec and the processing time in the case of further including the additional circuits is 9.25 μ sec, the initial value is "−150".

The initial value will now be described.

Figure 5:
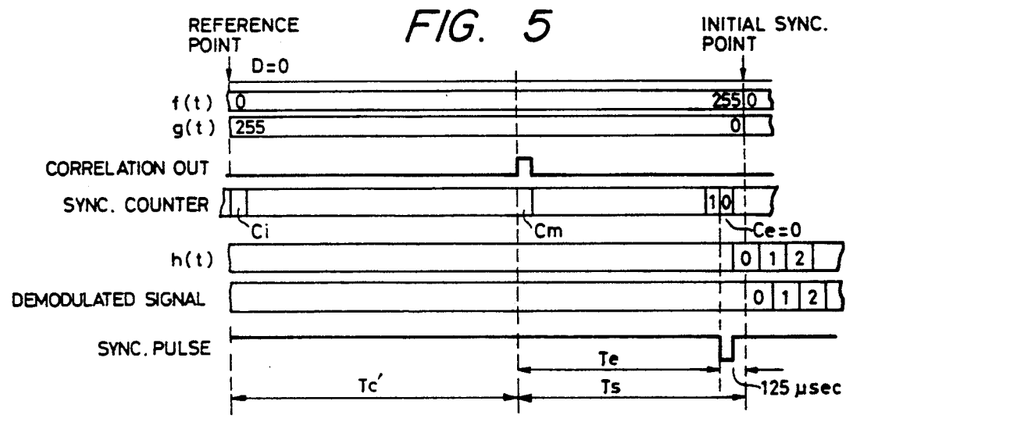
Figure 6:
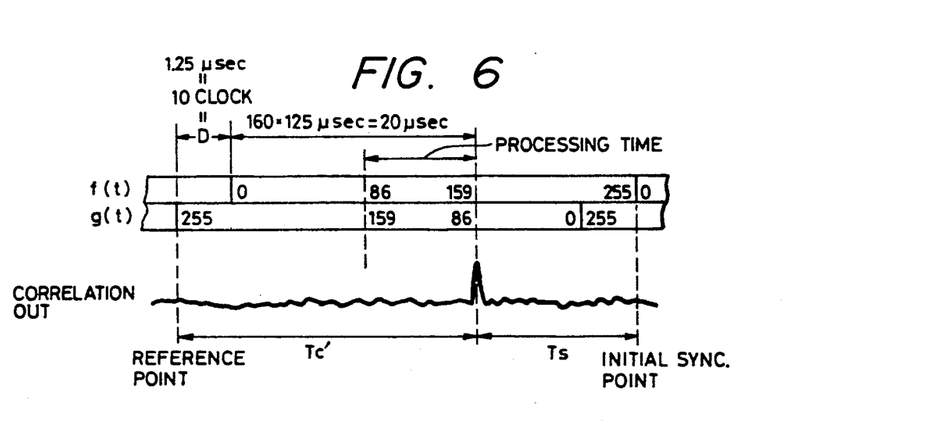

The interval $T_e$ from the correlation output point from the SAW convolver 7 unitl the count value of the sync counter 27 becomes "0" is $T_e = T_s - 125$ nsec as shown in FIG. 5 since one bit corresponds to 125 nsec. On the other hand, the interval $T_c'$ from the reference point until the correlation output is generated is $T_c' = D/2 + T_c$. In this expression, D denotes a delay time from the reference point until the input signal is supplied to the SAW convolver 7 as shown in FIG. 6, while $T_c$ denotes an interval from the reception of the input signal by the SAW convolver 7 until the correlation output is generated in the case where the delay time D is 0, as shown in FIG. 5. FIG. 6 shows the case where the input signal of the SAW convolver 7 is delayed than the reference point by 1.25 μsec, namely, D=1.25 μsec.

In FIG. 4, $$
\begin{aligned}
T_c &= T_a + T_b \\
&= \frac{\text{process interval}}{2} + \frac{256 \text{ (chips)}}{2} \times 0.125 \text{ (μsec)} \\
&= 165 \text{ (chips)} \times 0.125 \text{ (μsec)} \\
&= 20.625 \text{ (μsec)}
\end{aligned}
$$

The interval $T_s$ from the generation of the correlation output until the initial sync point is $$
\begin{aligned}
T_s &= 32 \text{ (μsec)} - T_c \\
&= 11.375 \text{ (μsec)}
\end{aligned}
$$

There is the following relation between the intervals $T_c$ and $T_s$.

$$
\begin{aligned}
T_s &= T_c - T_g = 20.625 \text{ (μsec)} - 9.250 \text{ (μsec)} \\
&= 11.375 \text{ (μsec)}
\end{aligned}
$$

In FIG. 6, if the delay time D exists, D is set to 1.25 μsec and the correlation is obtained by "159" to "86" bits in the reference PN code, i.e., the output PN code from the reference PN code generator 8. $T_c'$ can be obtained by $$
T_c' = D/2 + T_c = (1.25/2) + 20.625 \quad \text{(a)}
$$
$$
= 21.25 \text{ (μsec)}
$$

On the other hand, the interval $T_s$ is $$T_s = T_c' - T_g \quad \text{(b)}$$
$$= 21.25 - 9.25 = 12 \, (\mu\text{sec})$$

Thus, the initial sync point is obtained. The time interval $T_s$ from the true correlation output to the epoch point can be obtained as $T_c' - T_g$. Since $T_c'$ is the number of count pulses during the interval from the reference point to the true correlation output, if counter 27 is offset by $-T_g$ at the reference point, the count of counter 27 at the ture correlation output means $T_s$.

Returning to FIG. 5, since it is sufficient that the initial value $C_i$ of the sync counter 27 is offset by a value as much as only the count number of the process time $T_g$ of the SAW convolver 7 from expression (b), $$C_i = T_g/62.5 \, (\text{nsec}) + 2$$
$$= 9250/62.5 + 2$$
$$= 150$$

by considering that the interval $T_e$ is shorter than the interval $T_s$ by two clocks (this clock uses the period of the output of the VCXO 22 as the reference). Therefore, the initial value $C_i$ is "$-150$".

If the delay time D assumes 0 in the case shown in FIG. 6, the count value $C_m$ of the sync counter 27 when the correlation output is generated will be as follows since the interval $T_c'$ is 20.625 μsec from expression (a).

$$C_m = C_i + [T_c'/62.5 \, (\text{nsec})]$$
$$= -150 + [20625/62.5]$$
$$= 180 \, (\text{counts})$$

$$T_e = C_m \times 62.5 \, \text{nsec}$$
$$= 11250 \, (\text{nsec})$$

$$T_s = T_e + 125 \, (\text{nsec})$$
$$= 11375 \, (\text{nsec})$$

These values are the same as the values derived in FIG. 4, respectively.

Therefore, it will be understood than the initial value is a predetermined value corresponding to the processing time ($T_g = 9250$ nsec) of the SAW convolver 7.

Figure 2G:
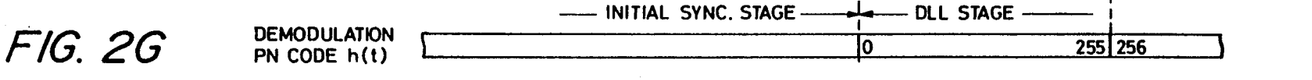

Next, the sync counter 27 counts up the output of the VCXO 22 after the generation of the PN code was started from the reference PN code generator 8 by supplying the clock pulse to the generator 8 until the true correlation output is generated. The up/down counting operations are switched when the true correlation output is generated and the sync counter 27 starts counting down the output of the VCXO 22. The borrow output generated during the down-counting operation is supplied as the sync pulse to the PN code generator control unit 30. By supplying the sync pulse, the sync reset pulse is output to the PN code generator 25 from the control unit 30. The demodulation PN code shown in FIG. 2G is output from the PN code generator 25 synchronously with the output pulse of the inverter 24. In this case, the PN code is output from the generator 25 from the timing of the PN epoch. The time delay of one clock pulse exists between the nth bit output and the (n−1)th bit output of the PN code generator 25. The outputs of the (n−1)th and nth bits are individually supplied to the multipliers 3 and 4 and multiplied with the output from the IF amplifier 1, respectively. The synchronization is held by the DLL B comprising the band pass filters 16 and 17, envelope detectors 18 and 19, subtracting amplifier 20, loop filter 21, voltage controlled oscillator 22, frequency divider 23, and inverter 24 in a well-known manner.

The output from the nth bit of the PN code generator 25 is supplied to the multiplier 2. The output from the IF amplifier 1 is de-spreaded and the spread spectrum signal is demodulated. The de-modulated output is baseband demodulated by the demodulator 29 through the band pass filter 28, so that the information output is obtained from the demodulator 29.

On the other hand, there is the case where the burst signal disappears or the like while the synchronization is held by the DLL B and the incoming spread spectrum signal cannot be received, so that the synchronization cannot be held due to some causes. In such a case, the initial synchronization is performed again. Namely, the unlock state of the DLL unit B is detected by circuits 31 to 35. When the unlock state is detected, a reset circuit 36 is driven by a set switch 37. Thus, the reference PN code generator control unit 15 and sync counter 27 are reset.

The unlock state detecting circuit shown in FIG. 1 is constituted so as to certainly detect the state. The output of the envelope detector 18 is supplied to a DC amplifier 31 having a high input impedance and amplified. The output of the DC amplifier 31 is supplied to a comparator 33 having a proper threshold level which enables the lock and unlock states to be discriminated. The comparator 33 compares the threshold level with the output level of the DC amplifier 31. On the other hand, the output of the envelope detector 19 is similarly supplied to a DC amplifier 32 having a high input impedance and amplified. The output of the DC amplifier 32 is supplied to a comparator 34 having a proper threshold level which enables the lock and unlock states to be discriminated. The comparator 34 compares the threshold level with the output level of the DC amplifier 32.

The outputs of the comparators 33 and 34 are supplied to an AND gate 35. The lock signal (or unlock signal) is derived from the output of the AND gate 35. When the DLL unit B becomes the lock state, the outputs of the envelope detectors 18 and 19, namely, the correlation detection outputs increase. When the lock state becomes stable, the potential levels of the outputs of the comparators 33 and 34 become high and the potential level of the output of the AND gate 35 also becomes high. Thus, the lock state of the DLL unit B is detected by the high-level output of the AND gate 35. On the contrary, when the DLL unit B is in the unlock state, the correlation detection outputs from the envelope detectors 18 and 19 decrease. When at least one of the correlation detection outputs decrease to a value lower than the threshold levels of the comparators 33 and 34, the potential level of at least one of the outputs of the comparators 33 and 34 becomes low, so that the potential level of the output of the AND gate 35 becomes low. The unlock state of the DLL unit B is detected by the low-level output of the AND gate 35.

It will be understood from the above description that only when the potential levels of both outputs of the comparators 33 and 34 become high due to the increase in outputs of the envelope detectors 18 and 19, the output level of the AND gate 35 becomes high, so that it is detected that the DLL unit B is in the lock state. When the low-level output is generated from the AND gate 35, it is detected that the DLL unit B is in the unlock state.

According to the foregoing constitution, a comparison is made by the first and second comparators to see if the first and second correlation detection outputs in the DLL unit B are at a predetermined level or not. The outputs of both comparators are supplied to the AND gate. The lock or unlock state of the DLL is detected on the basis of the output of the AND gate. Therefore, the lock state can be detected only when both of the correlation detection output levels are above the predetermined level. Thus, it is prevented that the lock state is detected before the stable lock state is obtained.

Further, the band pass filters and envelope detectors in the DLL unit B can be used to detect the lock and unlock states, so that the circuit is simplified.

Figure 7:
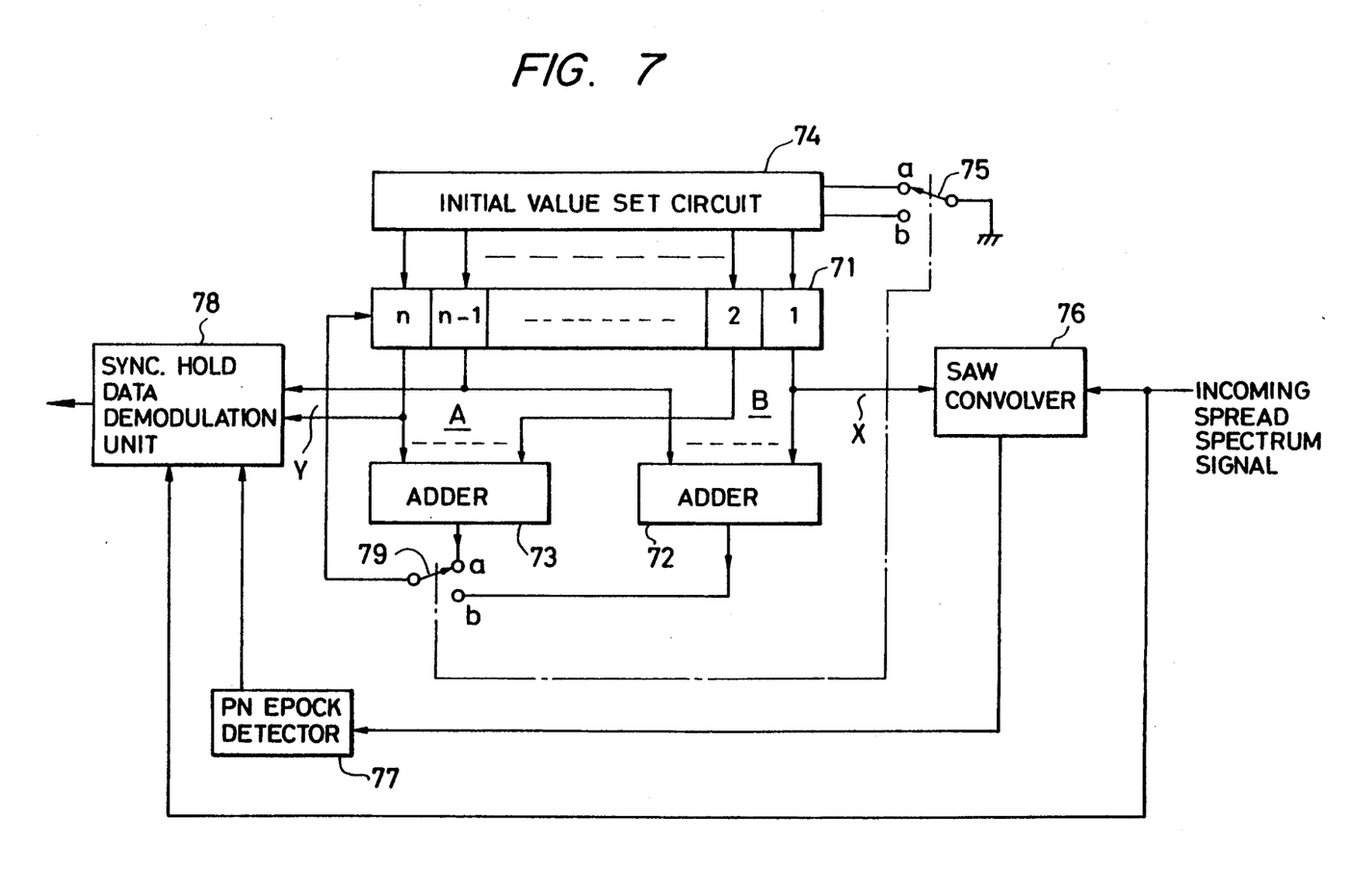
FIG. 7 is a diagram showing a circuit arrangement of a PN code generator in which shift registers are commonly used.

In the circuit arrangement shown in FIG. 1, the reference PN code generator 8 which is used for the initial synchronization and the demodulation PN code generator 25 which is used for the DLL have been respectively individually provided. However, the reference PN code generator and the demodulation PN code generator can be constituted by one shift register. FIG. 7 shows such an example. The reason why such a simple constitution can be realized is because as shown in FIG. 2G, since there is the time deviation between the initial sync mode and the DLL mode, the shift register can be switched in two modes.

The reference PN code generator A comprises: an n-stage left/right shift register 71; an adder 73 for adding the output from the leftmost stage of the shift register and the output from a predetermined stage on the basis of modulo "2", a code change-over switch 79; and an initial value setting circuit 74 for setting the first initial value into the shift register 71. The generator A feeds back the output of the adder 73 to the leftmost stage of the shift register 71 through a contact a of the switch 79 and outputs the reference nth-order M-series PN code for the generator polynominal of the preamble data from the rightmost stage of the shift register 71.

Similarly, the demodulation PN code generator B comprises: the shift register 71; an adder 72 for adding the output from the rightmost stage of the shift register 71 and the output from a predetermined stage, e.g., from the (n−1)th stage on the basis of modulo "2"; and a code change-over switch 75 which is switched interlockingly with the switch 79. The generator B changes over the switches 75 and 79 to the side of a contact b; sets the second initial value into the shift register 71; feeds back the output of the adder 72 to the leftmost stage of the shift register through the contact b of the switch 79; and outputs the nth-order M-series PN code for the generator polynominal for data demodulation from the nth stage of the shift register 1. For example, where a reference PN code series generated from a 5-bit shift register of polynominal of $x^5+x^3+1$ is 1111100110100100001010111011000, the time reverse polynominal for the demodulation PN code is $x^5+x^2+1$ and the demodulation PN code series from such polynominal is 0001101110101000010010110011111.

The shift register 71 shifts to the right by the bit rate of the PN code. On the other hand, an incoming spread spectrum signal is supplied as one input signal to an SAW convolver 76. The output of the reference PN code generator A is also supplied as the other input signal to the SAW convolver 76. The correlation between both input signals is detected by the SAW convolver 76. The SAW convolver 76 convolution integrates the incoming spread spectrum signal and the PN code whose time base was inverted and which was generated from the generator A in the range of the gate length of the SAW convolver 76. The SAW convolver 76 generates the correlation output when both of them coincide. The processing time (i.e., gate length) of the SAW convolver 76 is set to be shorter than the preamble data interval.

The correlation detection output of the SAW convolver 76 is supplied to a PN epoch detector 77 for detecting the boundary between the preamble data and the information data of the spread spectrum input signal, namely, the PN epoch time point (initial sync point). The code change-over switches 75 and 79 are switched to the side of the contact b from the side of the contact a by the output of the PN epoch detector 77.

The outputs of the nth and (n−1)th stages of the shift register 71 constituting the demodulation PN code generator B, the output of the PN epoch detector 77, and the incoming spread spectrum input signal are supplied to a data demodulation unit 78. The data demodulation unit 78 consists of the delay locked loop unit (DLL) to hold the synchronization in cooperation with the demodulation PN code generator B and the correlation device to multiply the code series which is output from the delay locked loop unit and the incoming spread spectrum input signal and to reversely spread them.

In the foregoing constitution shown in FIG. 7, the switches 75 and 79 are first switched to the side of the contact a in order to execute the operation in the initial sync mode and the first initial value is set into the shift register 71 by the initial value setting circuit 74. Then, the shift register 71 is shifted to the right. The reference PN code is supplied to the SAW convolver 76 from the reference PN code generator A for the initial synchronization. This reference PN code is convolution integrated with the incoming spread spectrum signal by the SAW convolver 76. When the correlation between them is detected, the correlation output is generated from the SAW convolver 76.

In response to the correlation output from the SAW convolver 76, the PN epoch time point is detected by the PN epoch detector 77 and the initial synchronization is attained. When the PN epoch time point is detected by the PN epoch detector 77, the switches 75 and 79 are switched to the side of the contact b and the operating mode is switched to the DLL mode. The second initial value is set into the shift register 71 by the initial value setting circuit 74. Then, the shift register 71 is shifted to the right. Therefore, the reference PN code generator A is switched to the demodulation PN code generator B. The demodulation PN code which is phase synchronized with the incoming spread spectrum signal is output to the data demodulation unit 78. The synchronization is held and the data is demodulated.

What is claimed is:

1. A spread PN code signal receiver including a delay locked loop circuit of performing a synchronization holding, the delay locked loop circuit (B) comprising:
   a PN code generator (25) for generating first and second sequences of PN code which are shifted in phase from each other by a predetermined number of bits;
   first correlation means (3) for taking a correlation between a received spread spectrum signal and the first PN code sequence to generate a first correlation signal indicative of the taken correlation;

second correlation means (4) for taking a correlation between the received spread spectrum signal and the second PN code sequence to generate a second correlation signal indicative of the taken correlation;

means (20) for combining the first and second correlation signals to produce a control signal;

VCO means (22) controlled by the control signal for generating a shift clock pulse sequence to be applied to said PN code generator;

a first comparator (33) for comparing the first correlation signal with a first threshold level to generate a first provisional lock signal when the first correlation signal exceeds the first threshold level;

a second comparator (34) for comparing the second correlation signal with a second threshold level to generate a second provisional lock signal when the second correlation signal exceeds the second threshold level; and an AND gate (35) in response to the first and second provisional lock signals for generating a lock signal indicative of the lock status of the delayed loop circuit when both of the first and second provisional lock signals are present or an unlock signal when either of the first and second provisional lock signals are not present.

2. A spread PN code signal receiver according to claim 1 further including an initial synchronization circuit (A) for taking an initial synchronization timing to the received spread spectrum signal, wherein said initial synchronization circuit in response to the unlock signal operates to take the initial synchronization again.

* * * * *